(No Model.)
H. GUTH.
HYDROMETER.
No. 317,453. Patented May 5, 1885.
Witnesses
W. E. Bowen.
Curtis Lammond
Inventor
Henry Guth
By David Mead
Atty.

UNITED STATES PATENT OFFICE.

HENRY GUTH, OF NEW YORK, N. Y.

HYDROMETER.

SPECIFICATION forming part of Letters Patent No. 317,453, dated May 5, 1885

Application filed November 20, 1884. (No model.)

*To all whom it may concern:*

Be it known that I, HENRY GUTH, a citizen of the United States, residing at New York city, have invented new and useful Improvements in Hydrometers, of which the following is a specification.

My invention relates to certain new and useful improvements in hydrometers of the kind which have thermometers combined therewith.

Heretofore in these instruments there have been two bulbs employed, one for the purpose of ballasting the tube when in the liquid, and the other containing the mercury of the thermometer. Also, considerable difficulty has been experienced when the ordinary instrument has been employed by Government gagers by reason of the difference in the scales.

The objects of my invention are to produce a hydrometer which is simpler and cheaper in construction than those heretofore made, and also to produce one which is particularly adapted for the use of gagers.

With these objects in view my invention consists of a hydrometer having combined therewith a thermometer the bulb of which serves as ballast for the instrument.

The invention further consists of a hydrometer having two scales, one the ordinary one employed in instruments of this kind and the other situated opposite thereto, and having their degrees of the same relation as exists between the custom-house proof-scale and that ordinarily used in hydrometers.

In order that those skilled in the art may know how to make my improved hydrometer, I will now proceed to describe the same in connection with the accompanying drawing, in which the figure represents a front view of the instrument.

In this drawing, A represents the main body of the tube containing the thermometer, which tube has a reduced upper portion, *a*, containing the scale, denoting the density of the liquid in which the instrument is placed. As will be apparent from an inspection of the drawing, each instrument is provided with two scales, one the ordinary hydrometer scale and the other the custom-house scale, arranged side by side, so that when a Government gager wishes to determine whether or not a liquid of certain density is above or below proof he has simply to compare the two scales.

As generally constructed heretofore, the bulb of the thermometer has been confined by the main casing of the instrument, and therefore considerable time has been required for the interior of the casing to become of the same temperature as the outer portion. In my improved instrument this defect is avoided and the cost of manufacture greatly reduced by forming the hydrometer with a bulb, B, at its lower end, which contains the mercury, and providing the bulb with an upwardly-projecting interior tube, *b*, bearing a scale by which the temperature of the material which surrounds the instrument is denoted.

By my construction it will be seen that I not only have the advantage of having the bulb in contact with the liquid, but I also make one bulb serve the double purpose of containing the mercury of the thermometer and ballasting the instrument.

Having thus described my invention, what I claim as new, and desire to secure by Letters Patent, is—

1. A combined hydrometer and thermometer in which the bulb containing the mercury of the thermometer serves also as the ballast for the combined instrument.

2. A combined hydrometer and thermometer in which the lower portion of the outer casing is formed into a bulb containing mercury, and having an upwardly-projecting thermometer-tube inclosed by the said casing and bearing the scale of the thermometer.

In testimony whereof I have hereunto set my hand in the presence of two subscribing witnesses.

HENRY GUTH.

Witnesses:
WILLIAM SENFT,
FERDINAND EIDMANN.